United States Patent [19]

Baur et al.

[11] 3,960,181
[45] June 1, 1976

[54] ARTICLE FOR COVERING VARIOUS PIPEFITTINGS

[76] Inventors: Charles B. Baur, 7302 Ocean Front Walk, Newport Beach, Calif. 92660; Roland P. Schultz, 2241 Raleigh St., Costa Mesa, Calif. 92627

[22] Filed: Oct. 15, 1973

[21] Appl. No.: 406,634

Related U.S. Application Data

[63] Continuation-in-part of Ser. No. 143,464, May 14, 1971, abandoned.

[52] U.S. Cl. .................................. 138/178; 138/99; 138/110; 285/45; 156/212; 156/218
[51] Int. Cl.² ........................................... F16L 57/00
[58] Field of Search ................. 161/149, 42–44; 285/45–55, 373, 419, DIG. 22; 264/219; 156/212, 213, 214, 217, 218; 220/42 F, 55 D, 67; 138/149, 99, 157, 161, 162, 110, 178; 113/116 UT; 29/157 A

[56] References Cited
UNITED STATES PATENTS

| | | | |
|---|---|---|---|
| 2,767,673 | 10/1956 | Gough | 24/202 X |
| 3,000,433 | 9/1961 | Kemper | 138/149 X |
| 3,222,777 | 12/1965 | Rutter et al. | 138/161 X |
| 3,347,276 | 10/1967 | Dunn | 138/166 |
| 3,379,218 | 4/1968 | Conde | 138/168 X |
| 3,495,629 | 2/1970 | Botsolas et al. | 138/149 |
| 3,503,426 | 3/1970 | MacMillan et al. | 138/168 |
| 3,578,026 | 5/1971 | Meyer | 138/110 |
| 3,654,049 | 4/1972 | Ausnit | 161/149 X |

*Primary Examiner*—Richard E. Aegerter
*Assistant Examiner*—James E. Bryant, III
*Attorney, Agent, or Firm*—Fulwider, Patton, Rieber, Lee & Utecht

[57] ABSTRACT

A cover for covering elbows or angles in tubular conduits formed in the shape of a convoluted sheet of material such as polyethelene, and shaped to form a first stable configuration state fitting part way around the object to be covered. Opposite ends of the cover are caused to encircle the selected portion of the object in a second stable configuration state. In other embodiments, the cover has an integral part thereof, coupling ribs, adhesive, a tongue-in-sleeve or belt-in-loop arrangement or other coupling means or combinations of coupling means by which two opposite ends of the cover are coupled together around an object.

4 Claims, 13 Drawing Figures

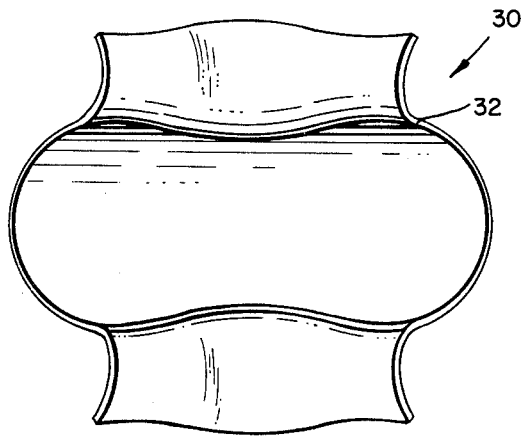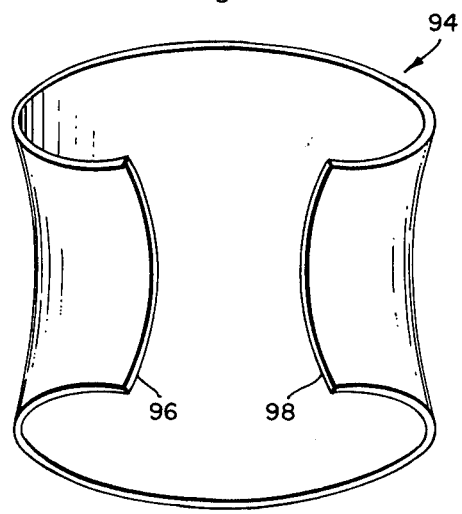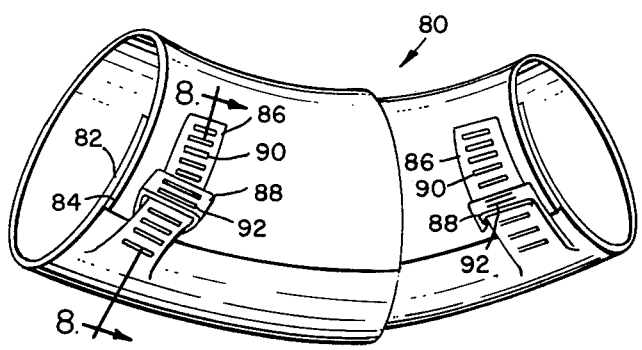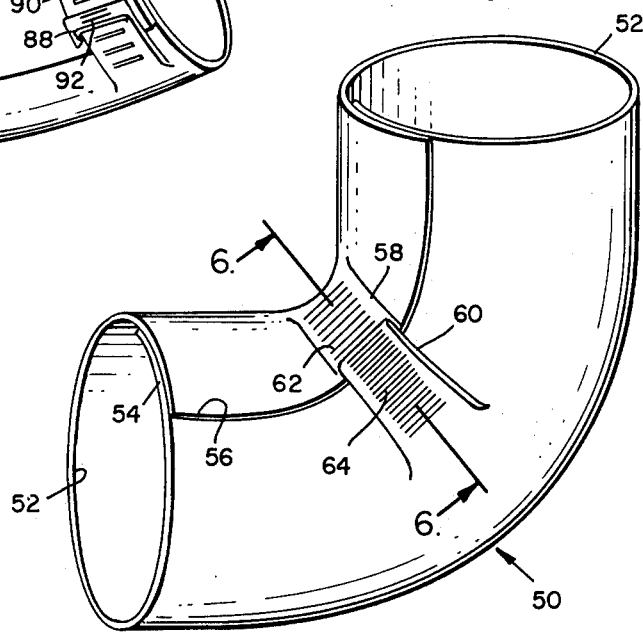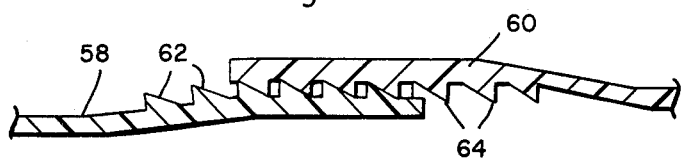

ARTICLE FOR COVERING VARIOUS PIPEFITTINGS

CROSS-REFERENCE TO RELATED APPLICATION

The present application is a Continuation-in-Part of U.S. Patent application Ser. No. 143,464 filed May 14, 1971 now abandoned, for METHOD AND ARTICLE FOR COVERING VARIOUS PIPEFITTINGS. The benefit of the earlier filing date is claimed for the subject matter common to both applications.

BACKGROUND OF THE INVENTION

1. Field of the Invention

The present invention relates to insulative coverings, and more particularly to insulative coverings adapted to surround a pipe elbow.

2. Description of the Prior Art

Many types of pipes, or odd shaped objects, or wires need to be surrounded with loose material for proper utilization. Typical loose material includes heat or electrical insulation. Where a pipe or wire changes direction or size it is useful to have a relatively simple means to securely hold the loose material to the pipe and to protect the loose material from scraping and other possible causes of damage. It is frequently advantageous to hold the loose material within a cross sectional area of a selected diameter. For other applications the diameter or shape of the cross sectional area should vary along the length of the pipe or wire. The prior art discloses several means to hold loose material to a pipefitting, such as covers formed from half sections of a suitable material such as plastic, cardboard or aluminum which are placed on the fitting, shaped if necessary, and affixed by an adhesive or screws or bolts. An alternative prior art technique includes the formation of a fabric-adhesive composite of alternate layers of fabric and adhesive. This method is very time consuming, since allowance must be made for the setting of the adhesive.

A third alternative includes the use of an elongated smooth surfaced, flexible article, fabricated from plastic, fiberglass or similar materials.

In each case, loose material or other insulative structure is packed around the pipefittings, the cover is placed to surround the material and the pipefitting is nailed, tacked, screwed, banded, stapled or attached by an adhesive. None of the prior art methods provide for a cover, however, which can be arranged in either of two stable states, one state allowing for the placement of the cover while the other state fixing the cover in place to surround the insulative structure.

SUMMARY OF THE INVENTION

A cover for covering elbows or angles in tubular conduits formed in the shape of a convoluted sheet of material such as polyethylene, and shaped to form a first stable configuration state fitting part way around the object to be covered. Opposite ends of the cover are caused to encircle the selected portion of the object in a second stable configuration state. In other embodiments, the cover has an integral part thereof, coupling ribs, adhesive, a tongue-in-sleeve or belt-in-loop arrangement or other coupling means or combination of coupling means by which two opposite ends of the cover are coupled together around an object. For convenience in installation, the overlapping ends of the cover can be oriented to an open position permitting the cover to be placed on the object and while so located, the overlapping ends can be reformed to the second stable state around the object.

Such covers are particularly suitable for objects having generally round cross sections. In a first example, the body or center portion of the cover has a cross section or trough describing an arc of more than 180° and the ends which are to overlap fold back. In a second example, the cross section of the body forms an arc of less than 180° and the ends which are to overlap fold back. In a third example, the cross section of the cover forms an arc of about 300° of greater cross sectional area than the object to be covered, and the ends which overlap are part of the arc. The first and third examples are more likely to hold themselves to the object prior to coupling of the overlapping ends while the first example is particularly suited for incorporating the surface dimples. Covers may also be utilized for wires and various types of specialty fittings including but not limited to T's, Y's, reducing fittings, valves, flanges, return bends, etc.

It is contemplated that such covers be formed to include deformations or dimples in the section about which the overlapping ends are deformed, such dimples precluding the existence of a single line on the surface of the cover about which the surfaces of the overlapping ends can curl or rotate. Furthermore, the configuration of such suface dimple provides for a pre-stressed shell structure which aligns the ends to an open position when the dimple is deformed by transverse manual pressure to extend toward the interior of the trough formed by the cover or to a closed and overlapping state when the surface dimple is projecting to the exterior of the cover. In the latter state, the ends may be affixed in their overlapping position by different coupling means such as adhesives, button and sleeve, rib, belt and loop, snaps, catches, straps, hinges, windows, holes, step-ups, step-downs, flanges, beads, teeth, cut outs, etc, any of which may be utilized with covers according to the present invention. Rows of ribs on one overlapping end may be caused to mate with rows of ribs on the other overlapping end to couple together the two overlapping ends. For most applications, the ribs should be straight, equally spaced and perpendicular to the direction in which the overlapping ends are moved when caused to overlap. Of course, for certain applications, the ribs may be curved, oriented differently, spaced differently, etc. The ribs may be bidirectional in that the slope is identical on both sides of the ribs, or unidirectional wherein the slope varies so that the ribs may be inserted easily but removed only with difficulty.

Adhesive may be placed in the recesses between ribs so that the mating of the ribs causes the adhesive to spread and securely join the two surfaces. Alternatively, the ribs may be utilized with a tongue-in-sleeve or a belt-in-loop coupling combination. A cover according to the present invention is self-contained in that it can be permanently affixed without tools, or additional coupling means such as nails, bands, etc.

BRIEF DESCRIPTION OF THE DRAWINGS

FIG. 2 illustrates an open cover having a preformed body shaped to fit around less than 180° of an arc;

FIG. 5 is a three-quarter view illustrating closed self-contained cover after coupling around a 90° elbow by a tongue-in-sleeve arrangement;

FIG. 6 is a cross section along the line 6—6 of FIG. 5 illustrating the manner in which the tongue penetrates the sleeve in an arrangement where the ribs are separated by wide recesses and permit easy entrance but prevent exit of the tongue from the sleeve;

FIG. 7 is a three-quarter view illustrating a closed self-contained belt and loop arrangement coupling two cylinders of different diameter at a 45° angle;

FIG. 9 illustrates an open cover having a preformed body extending around more than 180° of an arc and defining a cross sectional area larger than the cross sectional area of the object to be covered;

DESCRIPTION OF THE SPECIFIC EMBODIMENTS

Figure 1:
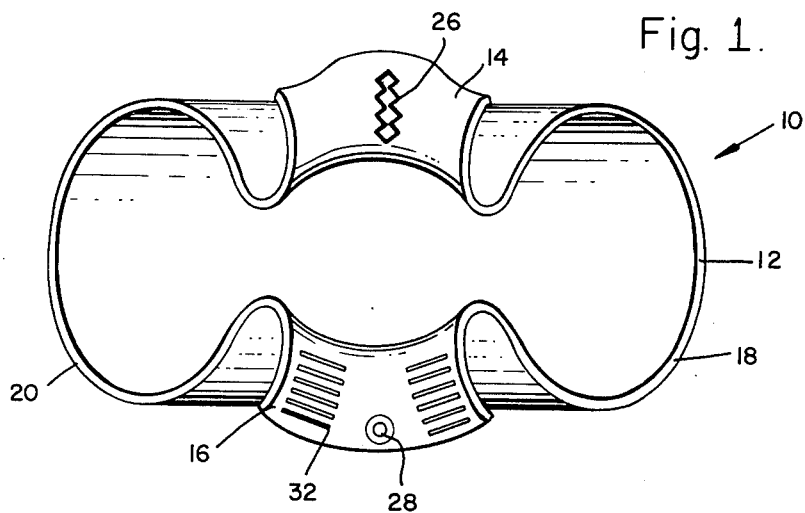
FIG. 1 illustrates an open self-contained cover with a preformed body having the shape of an arc of more than 180° and two opposite ends which couple by a rib, button and slot arrangement.

Generally, the invention is directed at a flexible cover adapted to contain surrounding structures, like insulative material, in position around various configurations of conduits. As shown in FIG. 1, one embodiment of such a flexible cover, shown as an open cover assembly 10, includes a central body or trough 12 preformed to fit around the circumference of the conduit sections over an arc of more than 180°. Such cover assembly 10 is fabricated from flexible material and includes two distally opposed overlapping ends 14 and 16 disposed to extend transversely from the lateral edges of the trough 12 and arranged to roll back into an open position to permit the installation of the cover assembly 10 over a conduit elbow or other intersection of two cylinders. After being located over the elbow, the distally opposed ends 14 and 16 are manually turned from the rolled back position through an intermediate unstable state to an overlapping or closed state around the circumference of the conduit to hold the fitting in place. This feature allows for a one-hand installation of the cover assembly 10 over a conduit elbow. The body or trough 12 is formed as a longitudinal cylindrical section joined along an arc section of a toroid conformed to the angular dimensions of the elbow and terminating in longitudinal ends 18 and 20 for attachment with adjacent covers extending over the adjacent sections of the conduit.

In this configuration, the cover assembly 10 can be affixed by any convenient means both at the longitudinal ends 18 and 20 and by joining the overlapping ends 14 and 16.

In order to accommodate various other shapes of conduits, a configuration shown in FIG. 2 provides a cover 30 having a central body 31 preformed to a cylindrical cross section of less than 180° of arc. While such configuration is particularly suited for conduit sections which are not cylindrical, the locating features of the central body are less effective. Similar to FIG. 1, the lateral edges of the central body extend into planar ends 14 and 16, such ends being conformed to overlap the circumference of the conduit.

Figure 3:
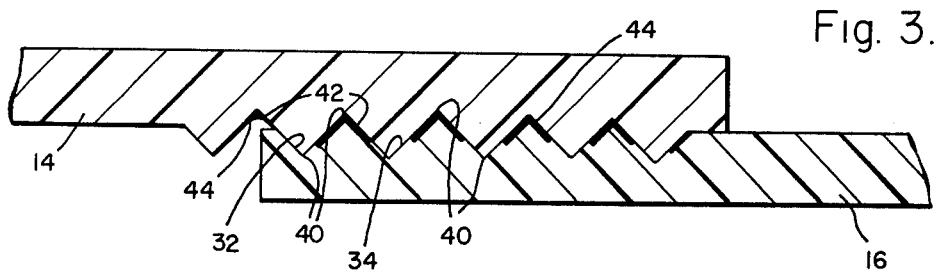
FIG. 3 is a cross section illustrating how the ribs from one end mate with the ribs from the opposite end and cause adhesive to securely couple the ribs of opposite ends.
Figure 4:
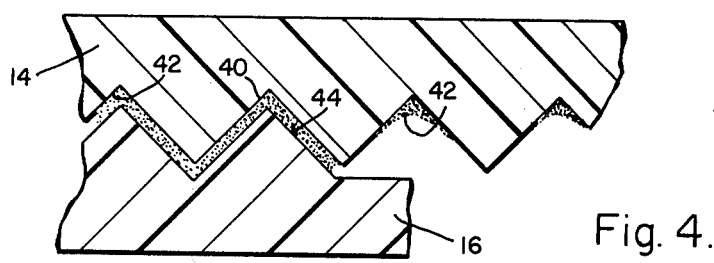
FIG. 4 is a cross section showing how adhesive may be stored in the recesses between ribs and automatically spread over much of the volume between the ribs as the ribs of opposite ends are coupled.

In either configuration of FIGS. 1 or 2, the ends 14 and 16 may be provided with various coupling features, one such coupling feature being shown in FIGS. 3 and 4.

FIGS. 3 and 4 illustrate a coupling arrangement of parallel ribs 32 and 34 formed on ends 14 and 16, such ribs to be joined by an adhesive 44 deposited thereon. The adhesive 44 may be placed in recesses 42 formed between peaks 40 of adjacent ribs 32 and 34. The peaks 40 act to prevent the adhesive 44 from being affected by contact with foreign objects until the opposite ends 14 and 16 of the cover 10 are aligned as shown in FIG. 4, where the peak 40 formed on end 16 is inserted into the recess 42 formed on end 14, such recess having therein adhesive 44 which, by compression, is caused to spread along the joining surfaces of the ribs.

As may be appreciated by view of FIG. 1, an appropriate button receptacle such as a serrated or otherwise variable width slot 26 and a button 28 may be utilized to hold the ends 14 and 16 together until the adhesive 44 sets. The installation thus becomes permanent as soon as the adhesive sets.

Such parallel rows of straight, uniformly spaced ribs 32 and 34 permit quick precise control of the volume enclosed when the ends 14 and 16 are coupled together. A large number of rows of ribs on one or both ends 14 and 16.

Reference should be made at this time to FIG. 5 which illustrates a self-contained closed cover 50 for a 90° elbow which fits around the elbow, leaving two open ends 52. The open ends 52 of the cover 50 may be coupled to adjacent covers. The overlapping ends 54 and 56 are coupled together by a tongue 58 inserted into a mating sleeve 60. The tongue 58 or sleeve 60 may be tapered to permit easier insertion of the tongue. A plurality of cooperating ribs 62 and 64 are respectively formed on the adjacent surfaces of the tongue 58 and sleeve 60. The shape, spacing and location of the ribs 62 and 64 may be varied.

One configuration of ribs 62 and 64 is shown in FIG. 6 which illustrates a cross section taken along the lines 6—6 of the tongue 58 and sleeve 60. The ribs 62 of the tongue 58 have a different slope on each side. The ribs 64 of the sleeve 60 also have a different slope on each side, such slopes allowing for a unidirectional engagement. The insertion sides have a low slope so that as the tongue 58 is inserted into the sleeve 60, the ribs 62 and 64 easily pass over each other. The tongue 58, however, cannot be easily removed from the sleeve 60 because of the relatively high slope on the removal sides of the ribs 62 and 64. Of course, the number, shape, spacing and orientation of the ribs could be varied within the general framework of the tongue and sleeve example.

Reference should be made at this time to FIG. 7 which illustrates a cover 80 conformed for a 45° elbow joining two pipes of differing diameter. Overlapping ends 82 and 84 of the cover 80 are coupled together around the circumference of the pipe by a dual belt and loop arrangement. Each belt 86 has ribs 90 on at least one surface thereof. The belt 86 mates with loops 88 which have ribs 92. By limiting the number of ribs 92, the force necessary to push a belt 86 through a loop 88 remains constant after the first rib 90 on the belt passes the last rib 92 on the loop. A plurality of belts and loops are particularly useful where covers have to cover odd shaped intersections, such as T's, Y's, intersecting cylinders or other odd cross sectional shaped elements of differing size wherein precise but different cross sections must be covered by the cover at different points along its length.

It is to be understood that any of the coupling means of the present invention may be utilized with any of the configurations for covers mentioned alone, and with other of the same type of coupling means or in combination with other types of coupling means. Covers according to the present invention are particularly useful in extreme environments, such as excessive heat, cold, humidity, etc. The present invention makes installation of a durable cover under difficult conditions relatively easy.

Figure 8:
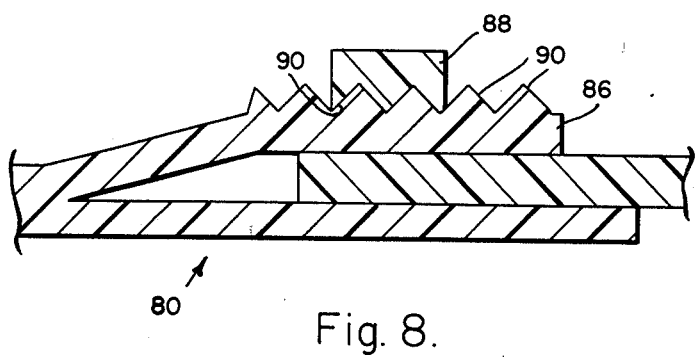
FIG. 8 is a cross section along the line 8—8 of FIG. 7 illustrating the manner in which the belt penetrates the loop.

Reference should be made at this time to FIG. 8, which is a cross section along the line 8—8 of FIG. 7 illustrating the manner in which the belt penetrates the loop. In this illustration, a fixed engagement length is maintained between ribs 90 and 92 by the fixed dimensions of sleeve 88. Such arrangement is particularly adapted to provide a relatively constant force between the tongue and the sleeve at all dimensions of engagement.

FIG. 9 illustrates yet another configuration for a cover 94 wherein the cross section of the cover generally has the form of an arc of about 300° of arc greater than the diameter of the intersection of cylinders to be covered. To insert, the cover 94 is pulled over the object to be covered and then the ends 96 and 98 are caused to overlap. Any of the previously described coupling means may be utilized with a cover having cross sectional shape 94.

Figure 10:
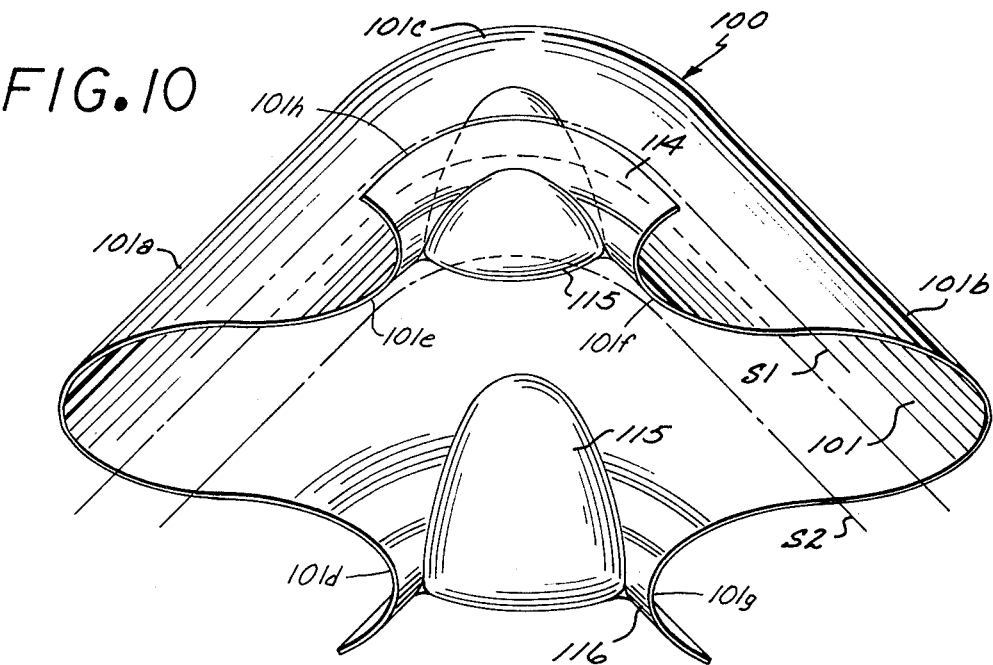
FIG. 10 is a perspective view of yet another embodiment of an elbow cover including surface dimples for providing a bistable structure.
Figure 11:
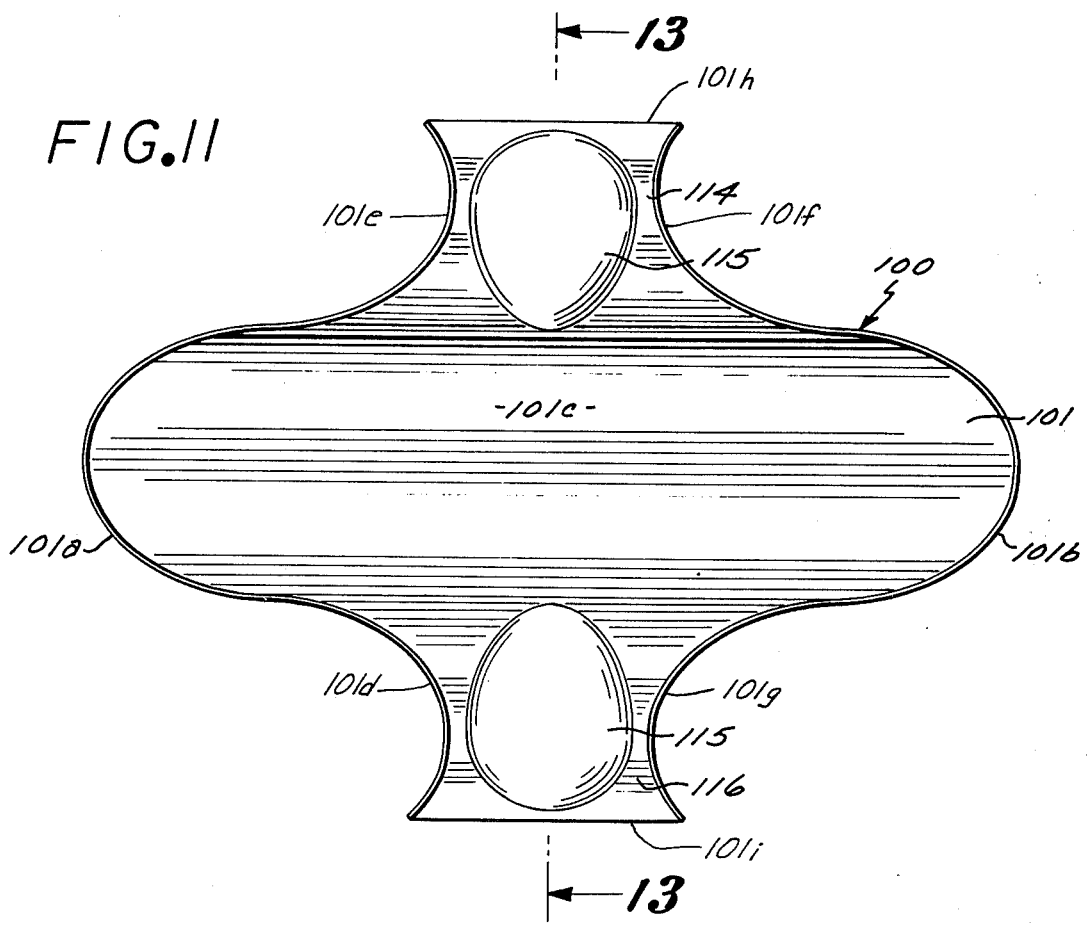
FIG. 11 is a bottom view of the elbow cover shown in FIG. 10.

Yet a further embodiment of an elbow cover particularly adapted for convenient installation on a conduit elbow is shown in FIGS. 10, 11, 12 and 13. The elbow cover of this configuration, generally designated by the numeral 100, includes a central trough 101 comprising two cylindrical sections 101a and 101b joined to form a 90° bend across a toroidal section 101c. Sections 101a, 101b and 101c are joined longitudinally with the concave surfaces on the interior thereof to conform to the exterior dimensions of an elbow in a conduit covered by insulative structure. More specifically, sections 101a, 101b and 101c are in the form of an arc to define a semicircular transverse cross section to fit the cylindrical surface of an insulated conduit, section 101c being conformed to the exterior semicircle section of a first hollow toroidal surface, such semicircular sections being taken along radial planes about the origin or the focus of an elbow. Sections 101a, 101b and 101c furthermore are bounded on their interior edges by surface lines S1 and S2 defining respective first joining edges, such surface lines S1 and S2 being aligned with the diameters of the imaginery semicircular sections, providing the reference line from which two opposed, overlapping toroidal end surfaces 114 and 116 extend. As shown in FIG. 10, the end surface tabs 114 and 116 include third, fourth, fifth and sixth cylindrical surface sections 101d, 101e, 101f and 101g which are reverse curved and formed to approximate the peripheral arc different than the arc formed by the insulated conduit itself and joined at their respective opposite edges of the first and second cylindrical sections 101a and 101b defined by the surface lines S1 and S2. The proximate ends of the third, fourth, fifth and sixth cylindrical sections 101d, 101g, 101e and 101f are connected together by means of second and third toroidal arc sections 101h and 101i conformed to fit the arcuate semicircle formed by the interior bend of the insulated elbow to be covered.

As previously stated, the material structure of the elbow cover disclosed herein comprises a thin, flexible shell or surface and therefore provides little prestress or bias across the thickness thereof, such that the end surfaces 114 and 116 can be completely reversed to conform with interior semicircular sections completing the exterior semicircular sections of the trough. Such configuration, however, is not inherently stable in either state and depending on the tolerances and internal stresses developed during manufacture within the skin structure itself, the end surfaces 114 and 116 can alternatively assume either a rolled back or open position, or can roll back from that position to a closed position to define an elbow. To preclude such inherent lack of stability, the arcuate surfaces of end surfaces 114 and 116 include inwardly projecting elliptic surface dimples 115, such dimples essentially forming a convolved bubble of elliptic planiform projected onto the end surfaces 114 and 116.

While such inward projection of the surface dimples 115 is appropriate to the configuration shown in FIG. 10, reorientation of the end surfaces 114 and 116 to an overlapping state will result in an outwardly projecting dimple. This particular feature is explicitly shown in FIG. 13. As will be noted, in FIG. 13 an imaginery surface section *I* corresponding to the surface section of the end surfaces 114 and 116 extends across the periphery of the surface dimple 115, such section *I* being shorter than the section length across the dimple 115. Thus a bistable configuration is formed which by virtue of the thinness or the relative lack of shell stiffness can be set to either an open or a closed stable state, as shown either in solid or in dotted line in FIG. 13.

It is to be noted that while in the open state, i.e. while the end surfaces 114 and 116 are curled back, the projecting thickness or elevation of dimples 115 acts to reduce the internal opening therebetween and therefore provides a securing or clamping mechanism by which the elbow cover 100 will be retained in position over the elbow and the insulating structure until such time as the end surfaces 114 and 116 are curled over to overlap the elbow. While any projection or any elevation of dimple 115 will tend to limit the opening size of the elbow cover, such effect is most pronounced if and when the elliptic planform of the surface dimple 115 is carried into or to a tangent with surface lines S1 and S2. Accordingly, if the method of manufacture or casting requires that minimal elevation dimples be formed, such can be accommodated by simply extending the planform of the dimple to intersect the maximum plan dimension of the trough 101.

Figure 12:
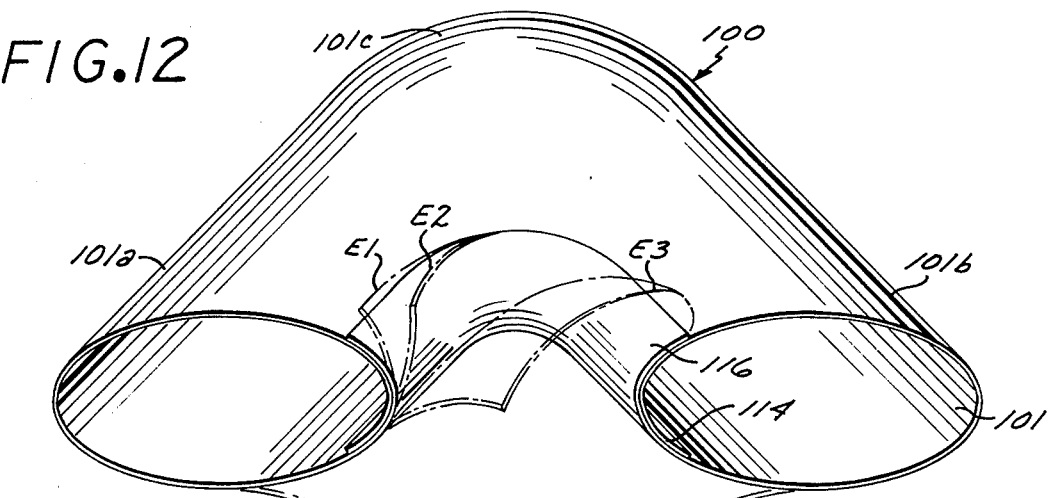
FIG. 12 is a bottom perspective view of an elbow cover similar to the elbow cover of FIG. 10, however without the surface dimples, illustrating the various states of transition typical of prior art structure.
Figure 13:
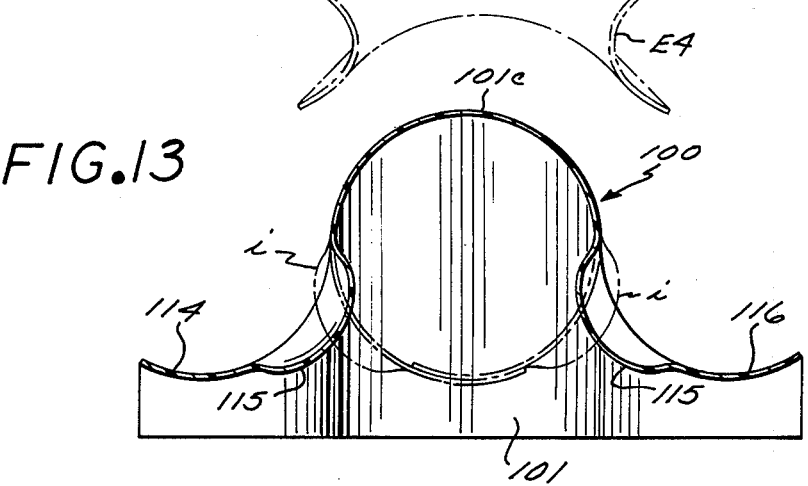
FIG. 13 is a sectional view taken along plane 13—13 of FIG. 11.

As will be noted in FIG. 12, the structural characteristics of the trough 101 including end surfaces 114 and 116, but excluding dimples 115, allows for a local curling of the exterior end surface, such curling typically occurring at either of the exposed corners thereof and propagating towards the interior of the elbow cover until a fully curled or open state is assumed. This effect is illustrated by the surface projections E1, E2, E3 and E4, where the curling through these projections is inherently dictated by the internal plate stresses such as the plate stresses created through the casting or molding process.

In operation, the elbow cover 100 is placed manually onto the elbow structure and is retained in position thereat by the clamping action of the surface dimples 115. Either one or other of the end surfaces 114 and 116 can then be manually forced into a closed or encircling state by manually pressing the elevation of the surface dimple and at the same time directing the free end of the end surface over the interior of the elbow. Once in overlapping position, the end surfaces can e secured by any selected combination of the securing devices described hereinabove.

Obviously, many modifications and variations of the present invention may be made with regard to the foregoing detailed description without departing from the spirit of the invention.

We claim:

1. An elbow cover formed from a flexible, thin-sheet structure, comprising:
   first and second cylindrical surface sections, each conformed transversely to approximate a peripheral arc of a first semicircle, said first and second surface sections each further including first longitudinally extending joining edges formed on either side thereof;
   a first toroidal arc section conformed radially to approximate said peripheral arc of said first semicircle connected between the adjacent transverse ends of said first and second cylindrical surface sections;
   third, fourth, fifth and sixth cylindrical surface sections conformed transversely to approximate peripheral arc of a second semicircle, each said third, fourth, fifth and sixth surface sections including second longitudinal joining edges joined to the respective longitudinal joining edges of said first and second surface sections; and
   second and third toroidal oppositely disposed arc sections conformed radially to approximate the peripheral arc of said second semicircle, connected between the respective adjacent transverse ends of said third and fourth, and fifth and sixth surface sections and including an elliptic deformation formed over the central section thereof.

2. An elbow cover according to claim 1 wherein:
   said first and second semicircle comprise substantially equal halves of one circle.

3. An elbow cover according to claim 1, further comprising:
   securing means connected to said second longitudinal edges of said third and fourth surface sections for effecting closure therebetween.

4. An elbow cover according to claim 1 wherein:
   said elliptic deformation is deformable to project to either side of said second arc section.

* * * * *